United States Patent [19]
Nikolov et al.

[11] 3,949,905
[45] Apr. 13, 1976

[54] DEVICE FOR THE PRODUCTION OF ARTICLES WITH A COMPACT SMOOTH SKIN AND A CELLULAR CORE FROM POLYMER MATERIALS

[75] Inventors: Ivan Dimov Nikolov; Stefan Georgiev Semerdjiev; Dragan Iliev Nenov; Nikolay Tihomirov Popov, all of Sofia, Bulgaria

[73] Assignee: Institute po Metaloznanie i Technologia na Metalite, Sofia, Bulgaria

[22] Filed: June 5, 1974

[21] Appl. No.: 476,600

[52] U.S. Cl. .......... 222/146 HE; 219/233; 219/307; 222/568; 425/378 R
[51] Int. Cl.² ................ B29F 1/03; B29F 1/08
[58] Field of Search .......... 239/133; 425/144, 381, 425/388, 378 R, 243; 219/233, 307, 381; 222/146 HE, 568

[56] References Cited
UNITED STATES PATENTS
3,077,636  2/1963  Peters .................. 425/243 UX
FOREIGN PATENTS OR APPLICATIONS
658,976  3/1963  Canada .................. 425/243

Primary Examiner—Robert B. Reeves
Assistant Examiner—David A. Scherbel
Attorney, Agent, or Firm—Karl F. Ross; Herbert Dubno

[57] ABSTRACT

An apparatus for the production of articles with a compact smooth skin and a cellular core from polymer materials, which contain blowing agents, by injection molding or extrusion wherein the apparatus contains an electric heating element within a channel through which the polymeric material is passed.

1 Claim, 1 Drawing Figure

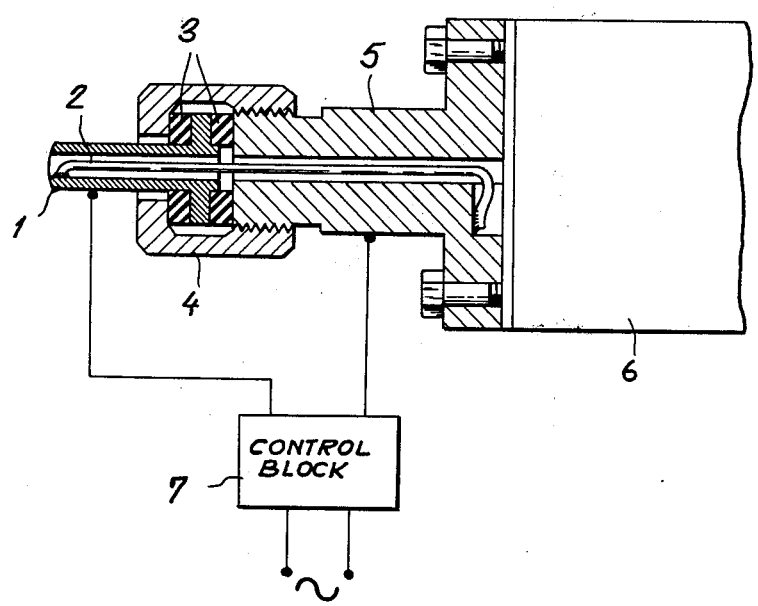

DEVICE FOR THE PRODUCTION OF ARTICLES WITH A COMPACT SMOOTH SKIN AND A CELLULAR CORE FROM POLYMER MATERIALS

This invention relates to a device for the production of articles with a compact smooth skin and a cellular core from polymer materials, which contain blowing agents, by injection molding or by extrusion.

Several methods are known for the production of such articles with a smooth skin. In one of them a deep-drawn foil is placed in the mold cavity before filling it with polymer melt. In another method the mold cavity is completely filled under high pressure with polymer melt, and after the formation of a compact skin the mold is opened up at such a distance as to create an additional volume for the foaming of the material in the interior. However, the application of these methods is limited only to articles of specific shapes.

Other methods are known, in which a material which does not contain a blowing agent is used for the formation of the compact skin, while a material without a blowing agent is used for the cellular core. A general disadvantage of these methods is the necessity of additional injection and distributing units, as well as the additional mechanisms to drive them.

Another method is known, in which a gas pressure is produced in advance in the mold cavity in order to prevent any foaming of the polymer melt when it fills the mould. This method provides a possibility to control the process of structure formation and to obtain articles with a compact skin of uniform thickness. To achieve this it is necessary to add to the injection molding machines a distributing unit and a vertical cylinder with piston, which are provided with driving and heating devices.

None of the aforedescribed methods provide a possibility for the production of articles with a compact smooth skin and a cellular core by extrusion.

It is therefore a general object of the invention to avoid the disadvantages of the known methods and devices by providing a method and device for the production of articles with a compact smooth skin and a cellular core from polymer materials containing blowing agents, using conventional injection molding machines or extruders.

This object is achieved by the method of this invention, which consists in that the polymer material is heated in the injection unit of the machine to a temperature lower than the decomposition temperature of the blowing agent, and in the case of injection molding first the necessary quantity of material for the formation of the compact skin is introduced into the mold, and then by additional heating of the injection nozzle the temperature of the polymer material which is flowing through is abruptly increased over the temperature of decomposition of the blowing agent to make possible the formation of the cellular core and at the end of the filling the temperature is again reduced, while in the case of extrusion the temperature only of the central zone of the melt flowing through the nozzle is maintained constantly or periodically over the decomposition temperature of the blowing agent to make possible the formation of the cellular core, while the skin is formed by the melt which is not heated additionally and is therefore not expanded, being during the flow in contact with the walls of the nozzle.

For a better understanding of the invention, reference should be made to the accompanying drawing in which there is illustrated a preferred embodiment of the invention. The drawing shows a diagrammatic cross-section through a nozzle.

According to the drawing, the nozzle consists of two components (tip) 1 and (housing) 5, which are connected by the nut 4 and are electrically insulated by means of the rings 3. In the axis of the nozzle hole or passage there is an electric heating element 2. The one end of this element is welded to the component 1, while the other end is welded to the component 5. The switching-on and switching-off of the heating element is performed by the supply and control block 7. The nozzle can be attached to the end of the plastifying-injection unit 6 of the injection molding machine or the extruder.

When injection molding articles, the process of the invention is as follows:

Polymer melt, heated to a temperature lower than the decomposition temperature of the blowing agent is injected into the mold cavity. After such a quantity of material, that is necessary for the formation of the compact skin has been introduced into the mold, then the electric heating element 2 in the nozzle is switched-on, thus abruptly increasing the temperature of the polymer melt which is flowing through over the decomposition temperature of the blowing agent. This heating continues until such a quantity of foamed material has been introduced into the mold, as is necessary for the formation of the cellular core. At the end of the filling the electric heating element 2 is switched-off in order to reduce the temperature so that the last portion of material cannot foam, in order to obtain a compact surface in the area of the sprue. The complete filling-up of the mold cavity takes place under the action of the pressure of the decomposition gas products, formed during the foaming of the material in the interior.

When extruding articles, the process of the invention is as follows:

The polymer material being extruded is heated in the screw barrel to a temperature lower than the decomposition temperature of the blowing agent. The central zone of the melt flowing through the nozzle is heated additionally by the heating element 2 at a temperature higher than the decomposition temperature of the blowing agent and as result of foaming the cellular core is formed. The skin is formed by the melt which is not heated additionally and is therefore unexpanded, remaining during the flow in contact with the walls of the nozzle. If it is necessary that the extruded articles have zones with a compact cross-section, the heating in the nozzle is carried out periodically.

What we claim is:

1. An apparatus for the injection molding of an article with a compact smooth skin and a cellular core which comprises:
    a. a nozzle comprised of a housing and a tip mounted in front of said housing, said housing and said tip forming an axial passage running throughout their combined length;
    b. an elongated electric heating element located coaxially within and throughout the passage;
    c. means for electrically insulating said housing from said tip;
    d. means for forcing a thermoplastic molding material through said passage, said element being connected at one end to said tip and at the other end to said housing; and e. a source of electric current connected across said tip and said housing for supplying current to said electric heating element, said tip having an annular flange, said insulating means including a pair of insulating rings flanking said flange and a nut engaging one of said rings and threaded onto said housing.

* * * * *